United States Patent [19]

Saito

[11] Patent Number: 5,093,909
[45] Date of Patent: Mar. 3, 1992

[54] SINGLE-CHIP MICROCOMPUTER INCLUDING AN EPROM CAPABLE OF ACCOMMODATING DIFFERENT MEMORY CAPACITIES BY ADDRESS BOUNDARY DISCRIMINATION

[75] Inventor: Mikio Saito, Tokyo, Japan

[73] Assignee: NEC Corporation, Tokyo, Japan

[21] Appl. No.: 450,314

[22] Filed: Dec. 14, 1989

[30] Foreign Application Priority Data

Dec. 14, 1988 [JP] Japan .................. 63-316672

[51] Int. Cl.5 .......................................... G06F 12/14
[52] U.S. Cl. ............................. 395/400; 365/195;
364/DIG. 1; 364/246.7; 364/244.6; 364/969.1
[58] Field of Search ... 364/200 MS File, 900 MS File;
365/195, 230.01, 230.03

[56] References Cited

U.S. PATENT DOCUMENTS

| 4,500,962 | 2/1985 | Lemaire et al. | 364/200 |
|---|---|---|---|
| 4,502,115 | 2/1985 | Eguchi | 364/200 |
| 4,521,853 | 6/1985 | Guttag | 364/200 |
| 4,580,212 | 4/1986 | Hosaka | 364/200 |
| 4,658,349 | 4/1987 | Tabata et al. | 364/200 |
| 4,682,283 | 7/1987 | Robb | 364/200 |
| 4,710,894 | 12/1987 | Kubo et al. | 364/900 |
| 4,718,038 | 1/1988 | Yoshida | 364/900 |
| 4,722,047 | 1/1988 | Chan et al. | 364/200 |
| 4,794,558 | 12/1988 | Thompson | 364/900 |
| 4,802,119 | 1/1989 | Heene et al. | 364/900 |
| 4,807,114 | 2/1989 | Itoh | 364/200 |

Primary Examiner—Stuart N. Hecker
Assistant Examiner—Rebecca L. Rudolph
Attorney, Agent, or Firm—Foley & Lardner

[57] ABSTRACT

A single-chip microcomputer includes therein an electrically programmable read-only memory (EPROM) including a specific cell of the EPROM storing an item of information for discrimination of memory space. When a reset signal is applied for initializing the single-chip microcomputer, the specific cell of the EPROM is selected and read out, and further latched in a latch circuit. On the basis of the content of the latch circuit, the single-chip microcomputer discriminates and sets a boundary between an internal memory and an external memory during programmed operation.

8 Claims, 4 Drawing Sheets

SINGLE-CHIP MICROCOMPUTER INCLUDING AN EPROM CAPABLE OF ACCOMMODATING DIFFERENT MEMORY CAPACITIES BY ADDRESS BOUNDARY DISCRIMINATION

BACKGROUND OF THE INVENTION

1. Field of the Invention

The present invention relates to a single-chip microcomputer, and more specifically to a single-chip microcomputer including therein an erasable programmable read only memory (called "EPROM" in the specification) which can be written, read and erased.

2. Description of related art

In general, a single-chip microcomputer has included a central processing unit for executing data processing, a memory section for storing programs and data, and an input/output section for performing a data transfer between the microcomputer and an external device, the central processing unit, the memory section and the input/output section being assembled on a single integrated circuit chip. This type of microcomputer, which is one of stored program controlled apparatuses, can execute different processings by changing a program, and therefore, has been widely used as a control device in various fields.

However, a program memory and a data memory have to have different capacities required dependently upon application systems and processings to be executed. Therefore, different microcomputers which have a central processing unit and an input/output section of the same functions but which include a different capacity memory, have been now developed and manufactured.

On the other hand, with a recent developed integrated circuit technology, single-chip microcomputers including an EPROM as a program memory have appeared, in addition to those which include a read only memory having a program permanently built in during its manufacture in accordance with a specially created pattern or mask (called "mask ROM" hereinafter).

The single-chip microcomputer including the EPROM therein is advantageous in that even after the single-chip microcomputer is assembled in a package and put in a finished condition as an integrated circuit, a program can be written to the EPROM of the single-chip microcomputer. Therefore, since the single-chip microcomputer can shorten the time required from a design of a program until actual operation of the system, the single-chip microcomputer has been widely utilized for program evaluation in the course of system development and for small-amount production.

In the case of utilizing the single-chip microcomputer including the EPROM therein for the purpose of evaluating a program to be used in an apparatus including a mask ROM therein, in some cases a completely equivalent evaluation cannot be executed because of differences in memory capacity between the EPROM and the mask ROM.

For example, in a system having a function of discriminating a space of a program memory and fetching an instruction from an external memory if an accessed memory space is not within the memory included in the single-chip microcomputer, if the memory capacity is different between the microcomputer having the EPROM and the microcomputer having the mask ROM, a boundary between the internal memory and the external memory in the microcomputer having the EPROM is also different from the internal/external memory boundary in the microcomputer having the mask ROM, and therefore, a memory space from which an instruction is read is also different. In addition, if an internal data memory has a different capacity, a memory access to a memory space corresponding to a memory having a small memory capacity can be equivalently executed, but data stored in a memory space having a large memory capacity becomes different. Accordingly, in order to evaluate a program by using a system having a different memory capacity, it is necessary to design the program taking the difference in consideration, and to check whether or not there is access to a memory space which does not actually exist. Because of the above mentioned circumstance, a device including an EPROM, completely equivalent to a device including a mask ROM, has been required.

At present, however, the amount of use of devices including an EPROM is one-tenth or less of the amount of use of devices including a mask ROM. Therefore, it would be very expensive and not so economic to develop and manufacture a system including therein a number of EPROMs corresponding to different memory capacities.

SUMMARY OF THE INVENTION

Accordingly, it is an object of the present invention to provide a single-chip microcomputer having an EPROM therein, which has overcome the above mentioned defect of the conventional one.

Another object of the present invention is to provide a single-chip microcomputer having a single EPROM therein, but capable of executing an operation equivalent to that of a device having a different capacity of memory, thereby to reduce a load for program development.

The above and other objects of the present invention are achieved in accordance with the present invention by a single-chip microcomputer which includes therein an EPROM, comprising a circuit for storing in a specific cell of the EPROM an item of information for discrimination of a memory space, a circuit responding to a reset signal used for initializing the single-chip microcomputer and operating to select and read the specific cell of the EPROM and to latch the read information, and a circuit for defining a boundary between an internal memory and an external memory on the basis of the content of the latch means.

With the above mentioned arrangement of the single-chip microcomputer, the EPROM included in the single-chip microcomputer has a fixed memory capacity, but there is provided the means for changing the boundary between the internal memory and the external memory, so that the single-chip microcomputer can execute an operation equivalent to that of a device having an internal memory capacity smaller than the EPROM of the single-chip microcomputer.

In addition, since the information for discrimination of a memory space is stored in the EPROM and the boundary between the internal memory and the external memory is controlled on the basis of the information stored in the EPROM, it is possible to set a desired memory capacity after the single-chip microcomputer has been put in a finished condition as an integrated circuit. Furthermore, the information for discrimination of a memory space stored in the EPROM will be maintained even after power-off.

DESCRIPTION OF THE PREFERRED EMBODIMENTS

Figure 1:
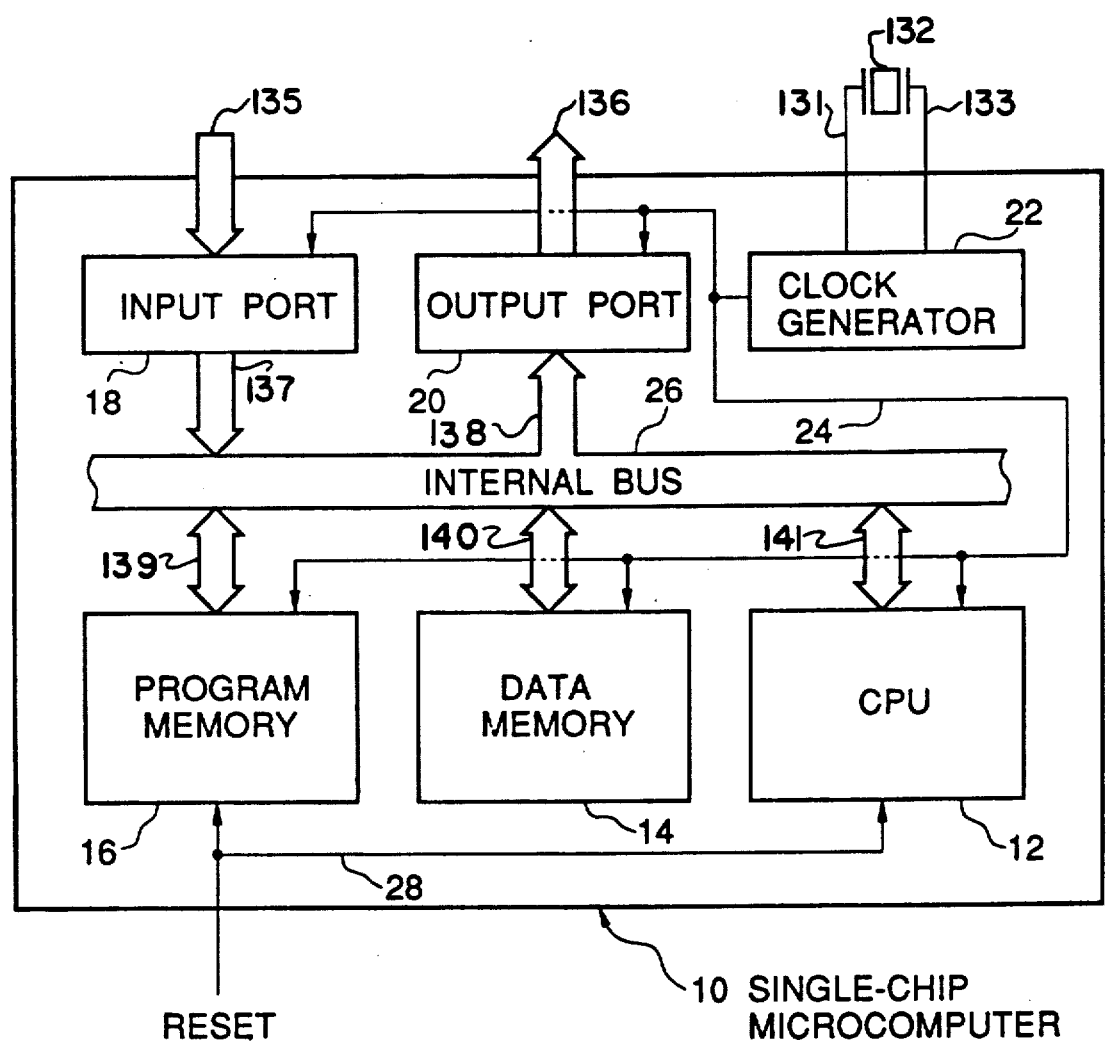
FIG. 1 is a block diagram of a first embodiment of the single-chip microcomputer in accordance with the present invention.

Referring to FIG. 1, there is shown a block diagram of a first embodiment of the single-chip microcomputer in accordance with the present invention.

The single-chip microcomputer, generally indicated by Reference Numeral 10, mainly comprises a central processing unit (CPU) 12 for executing data processing and for controlling the whole microcomputer, a data memory 14 for storing data, a program memory 16 for storing programs, an input port 18 for receiving data from an external device (not shown), for example an external memory, an output port 20 for outputting data to an external device (not shown), for example an external memory, and a clock generator 22 for generating and supplying an internal clock through a line 24 to the CPU 12, the data memory 14, the program memory 16, the input port 18 and the output port 20. In addition, the circuits excluding the clock generator 22 are coupled to an internal bus 26, so that data and addresses are transferred among these circuits through the internal bus 26. A reset signal RESET is supplied to the CPU 12 and the program memory 16 through a line 28.

In the shown embodiment, an item of information for discrimination of a memory space is supplied from an external device and written to a specific cell of the program memory 16. At the time of initializing, responding to for example the reset signal RESET, a content of the specific cell of the program memory is read and latched in a latch circuit not shown in FIG. 1. A boundary between an internal memory and an external memory is set or changed on the basis of the content of the latch circuit. In an operation after the resetting, the microcomputer 10 operates to automatically switch a memory access between the internal memory and the external memory in accordance with the set boundary between the internal memory and the external memory. Thus, the shown single-chip microcomputer can execute an operation equivalent to a single-chip microcomputer having a mask ROM of a desired memory capacity.

Figure 2:
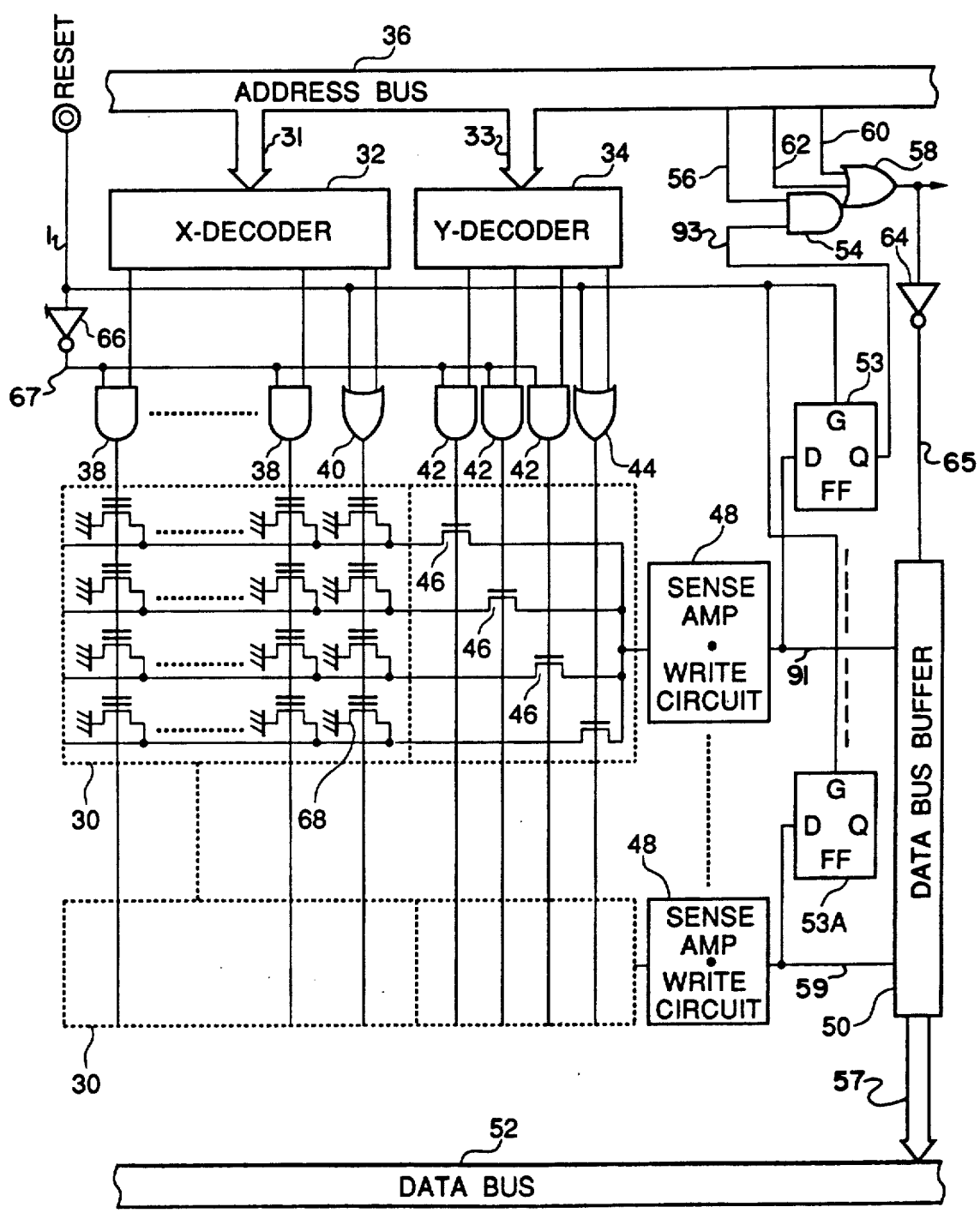
FIG. 2 is a block diagram of the program memory in the single-chip microcomputer shown in FIG. 1.

In order to realize the above mentioned operation, the program memory 16 is constructed as shown in FIG. 2. Specifically, the program memory 16 includes a plurality of memory cell matrix blocks 30, and an X-decoder 32 and a Y-decoder 34 coupled to receive an address from an address bus 36 included in the internal bus 26. Outputs of the X-decoder 32 are connected to corresponding columns of the memory cell matrix blocks 30 through an AND gate 38 or an OR gate 40. Outputs of the Y-decoder 34 are connected through an AND gate 42 or an OR gate 44 to corresponding transfer gates 46 which are coupled between corresponding rows of the memory cell matrix blocks 30 and associated sense amplifier and write circuits 48. The sense amplifier and write circuits 48 are coupled to a data bus buffer 50, which is coupled to a data bus 52 included in the internal bus 26.

One of the sense amplifier/write circuits 48 is also connected to an input D of a latch circuit 53, which has a gate control input G connected to receive the reset signal RESET. An output Q of the latch circuit 53 is connected to one input of an AND gate 54, which is connected at its other input to a third significant bit 56 of the address bus 36. An output of the AND gate 54 is connected to one input of a three-input OR gate 58, the other inputs of which are connected to receive the most significant bit 60 and a next significant bit 62 of the address bus 36. An output of the OR gate 58 is supplied through an inverter 64 to the data bus buffer 50. Furthermore, the reset signal RESET is supplied to the OR gates 40 and 44 and an inverter 66, and an output of the inverter 66 is connected to all the AND gates 38 and 42 associated with the X-decoder 32 and the Y-decoder 34.

Now, an operation will be explained in the case where one-bit within the program memory gives information for discrimination of a memory boundary. Therefore, assume that an item of information for discrimination of a memory space is stored in a EPROM cell 68 which is connected to the OR gate 40 and is also connected to the transfer gate 46 controlled by the output of the OR gate 44. The writing of the EPROM cell 68 can be performed in a well known manner by supplying an address onto the address bus 36 and data to the data bus 52, and therefore, a detailed explanation will be omitted.

In general, an address on the address bus 36 is decoded by the X-decoder 32 and the Y-decoder 34, and one EPROM cell is selected by the X-decoder 32 and the Y-decoder 34. A content stored in the selected EPROM cell is supplied through the sense amplifier and write circuit 48 to the data bus buffer 50, and further to the data bus 52.

In most cases, before a program is executed, the overall system is initialized. In the shown embodiment, the initialization is triggered by bringing the reset signal RESET to a high level. If the reset signal RESET is brought to the high level, the outputs of the OR gates 40 and 44 are also brought to the high level regardless of a content of the address bus 36, and on the other hand, the output of the inverter 66 is brought to a low level, so that all the outputs of the logic gates receiving the outputs of the X-decoder 32 and the Y-decoder 34 excluding the OR gates 40 and 44 are brought to the low level. As a result, the specific EPROM cell 68 is selected without exception at the time of resetting.

A content of the selected specific EPROM cell 68 is supplied through the sense amplifier and write circuit 48 to the data bus buffer 50 and also latched in the latch circuit 53 since the gate control input G of the latch circuit 53 is at this time at the high level by the reset signal RESET.

After the initialization is completed and the reset signal RESET is brought to the low level, the execution of the program is started. When the reset signal RESET is brought to the low level, the gate of the latch circuit 53 is closed, and therefore, the content of the latch circuit no longer changes. On the other hand, all the AND gates 38 and 42 are opened, so that the outputs of the X-decoder 32 and the Y-decoder 34 are outputted to the memory cell matrix and the associated transfer gate array as they are.

If the output of the latch circuit 53 is at the low level, the output of the AND gate 54 is also at the low level. Therefore, if at least one of the most significant bit 60 and the next significant bit 62 of the address bus 36 is at the high level, the output of the OR gate 58 is brought to the high level, and accordingly, the output of the inverter 64 is brought to the low level. As result, the data bus buffer 50 is inhibited to output the content of the EPROM to the data bus 52.

On the other hand, if the output of the latch circuit 53 is at the high level, the inverter 64 outputs the low level signal to the data bus buffer 50, similarly to the case in which any one of the most significant bit 60, the next significant bit 62 and the third significant bit 56 of the address bus 36 is at the high level. In other words, outputting content of the EPROM through the data bus buffer 50 to the data bus 52 is inhibited. regardless of the most significant bit 60, the next significant bit 62 and the third significant bit 56 of the address bus 36.

Thus, if the microcomputer is controlled to fetch data from an external memory when the output of the OR gate 58 is at the high level, it is possible to discriminate that the access space is external when the output of the OR gate 58 is at the high level, and internal when the output of the OR gate 58 is at the low level.

For example, assume that the address bus 38 is composed of 8 bits. In this case, if the output of the latch circuit 53 is at the low level, it is discriminated that addresses $00_H$ to $3F_H$ (suffix "H" indicates hexadecimal notation) all having two most significant bits of the low level are within an internal memory space, and addresses $40_H$ to $FF_H$ are within an external memory space. On the other hand, if the output of the latch circuit 53 is at the high level, it is discriminated that addresses $00_H$ to $1F_H$ all having three most significant bits of the low level are within an internal memory space, and addresses $20_H$ to $FF_H$ are within an external memory space.

As seen from the above, the first embodiment is such that, at the time of resetting, the specific EPROM cell is selected and read out and the read-out data is latched in the latch circuit, and after the completion of the resetting operation, the size of the internal memory space to be used is determined on the basis of the content of the latch circuit. Therefore, the first embodiment of the single-chip microcomputer can execute an operation equivalent to a microcomputer having a desired capacity of memory.

The above mentioned embodiment is such that the boundary between the internal memory space and the external memory space is determined on the basis of the information stored in only one specific EPROM cell. However, if information concerning the boundary between the internal memory space and the external memory is stored in a plurality of specific EPROM cells, and if a corresponding number of latch circuits 53A similar to the latch circuit 53 are provided in combination with a logic gate circuits (not shown) are coupled to the address bus and the latch circuits, it is possible to set or change a plurality of boundaries between the internal memory space and the external memory space.

Figure 3:
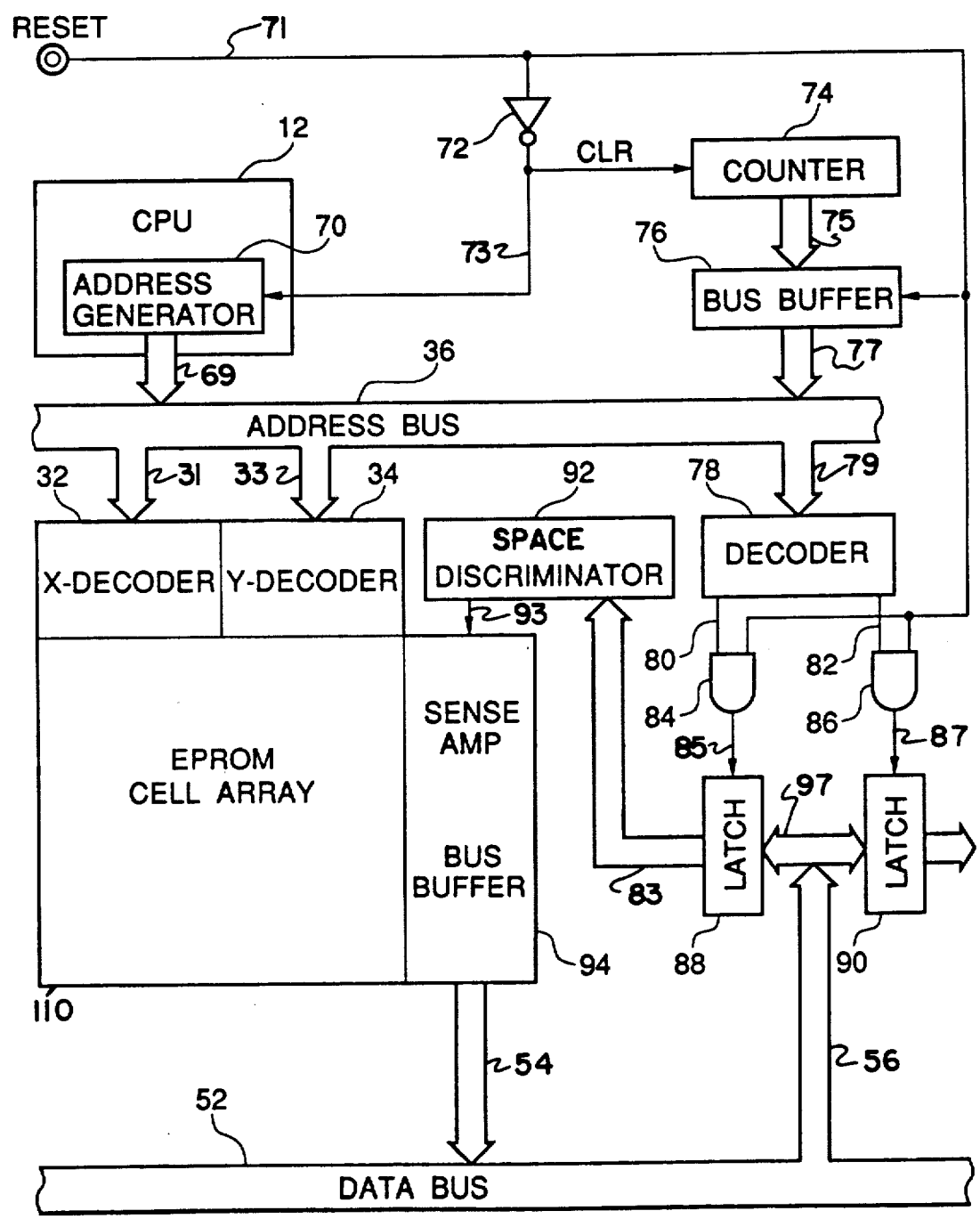
FIG. 3 is a block diagram of a second embodiment of the single-chip microcomputer in accordance with the present invention.

Referring to FIG. 3, there is shown a block diagram of the second embodiment of the single-chip microcomputer in accordance with the present invention. In FIG. 3, elements similar or corresponding to those shown in FIGS. 1 and 2 are given the same reference numerals.

The CPU 12 includes an address generator 70, which is coupled to output an address to the address bus 36 in response to the reset signal RESET supplied through an inverter 72. The output of the inverter 72 is also supplied to a counter 74 as a clear signal. A content of the counter 72 is outputted to the address bus 36 through a bus buffer 76, which is controlled by the reset signal RESET. In addition, the address bus 36 is coupled to a decoder 78. This decoder decodes an address on the address bus and operates to generate a signal 80 of the high level when an address storing information for determining a program memory space is detected, and a signal 82 of the high level when an address storing information for determining a data memory space is detected. These signals 80 and 82 are supplied to two AND gates 84 and 86, respectively, which are also connected to receive the reset signal RESET. Outputs of the AND gates 84 and 86 are connected to a gate control input of a pair of latch circuits 88 and 90, respectively. A data input of each of the latch circuits 88 and 90 is coupled to the data bus 52. An output of the latch 88 is coupled to a space discriminator 92, which controls the sense amplifier and bus buffer 94 associated with the EPROM cell array 110.

The embodiment shown in FIG. 3 operates as follows:

When a program is executed, if the reset signal RESET is brought to a low level, the output of the inverter 72 is brought to the high level so as to clear the counter 74 and to cause the address generator 70 to output an address of the EPROM. The generated address is outputted onto the address bus 36 and decoded by the X-decoder 32 and the Y-decoder 34, so that the content of the EPROM cell designated by the generated address is read out and outputted to the data bus 52 through the sense amplifier and bus buffer 94.

Thereafter, if the reset signal RESET is brought to the high level for the purpose of initialization, the output of the inverter 72 is brought to the low level, the address output from the address generator 70 is inhibited, and the counter 74 starts its counting operation. When the reset signal RESET is maintained at the high level, the output of the counter 74 is supplied to the address bus through the bus buffer 76. As a result, a content or data of the EPROM designated by the address sequentially incremented (or decremented) by the counter 72 is sequentially read out and outputted to the data bus 52.

As mentioned above, when an address which stores information for determining a program memory space is outputted onto the address bus 36, the decoder 78 generates the signal 80 of the high level. When an address which stores information for determining a data memory space is outputted onto the address bus 36, the decoder 78 generates the signal 82 of the high level. Since the reset signal RESET is at the high level, the signals 84 and 86 of the high level outputted from the decoder 78 are supplied to the latch circuits 88 and 90, respectively. Thus, when the signal 80 reaches a high level, the information for determining the program memory space, which is outputted on the data bus 52, is latched into the latch circuit 88. When the signal 82 reaches a high level, the information for determining the data memory space, which is also outputted on the data bus 52, is latched into the latch circuit 90.

On the basis of the information held in the latch circuit 88, the space discriminator 92 discriminates the program memory space, and controls the sense amplifier and bus buffer 94 after the reset operation has been completed, in such a manner that the EPROM other than a portion corresponding to the set program memory space is inhibited to be read. On the other hand, the content of the latch 90 is supplied to a circuit (not shown) for controlling the data memory space, so that a space used as a data memory is discriminated.

Figure 4:
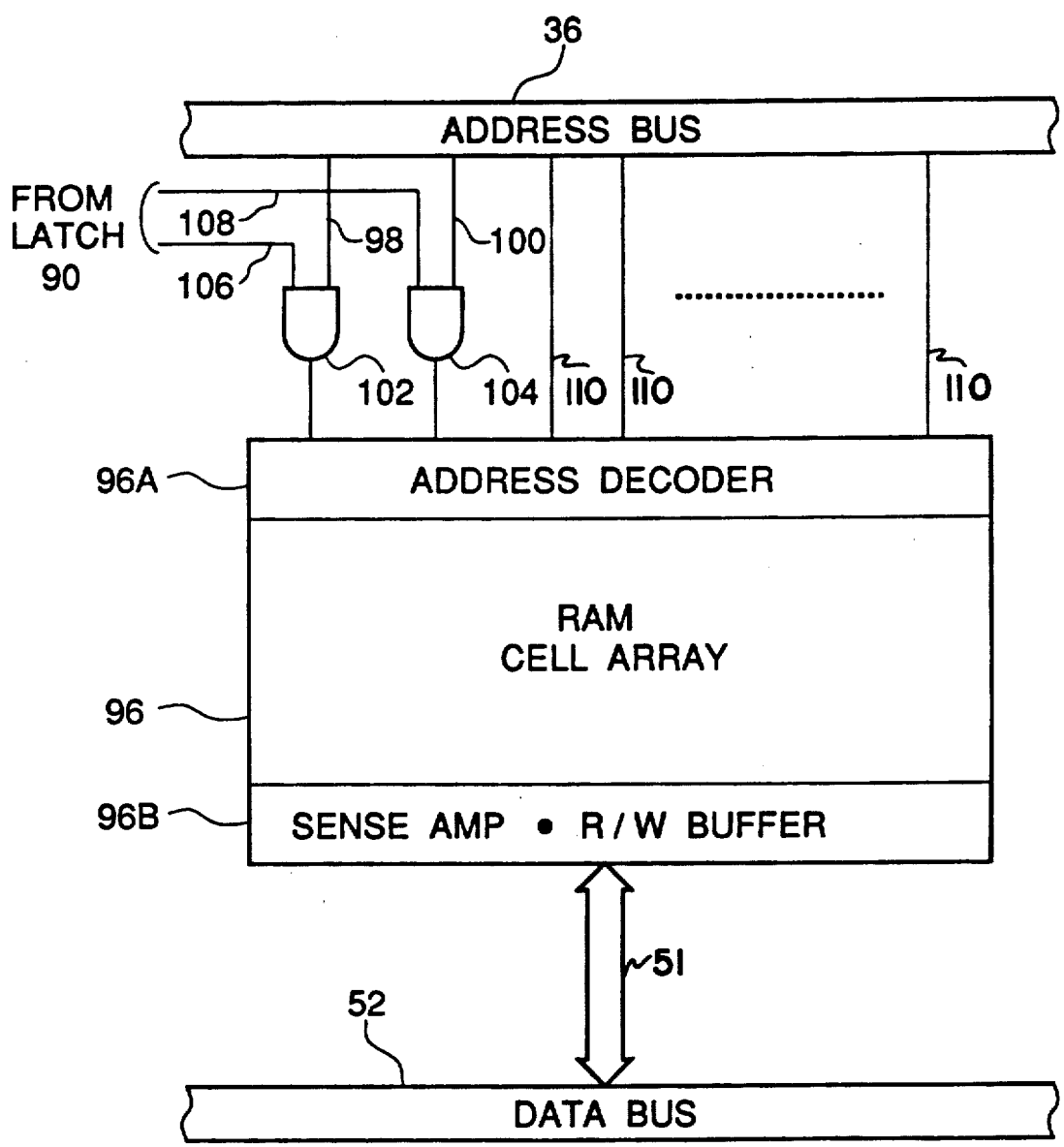
FIG. 4 is a block diagram illustrating the data memory space control in the single-chip microcomputer shown in FIG. 3.

Turning to FIG. 4, there is shown one example of the circuit which receives the output of the latch circuit 90 and operates to control the data memory space. In the shown circuit, a random access memory (RAM) 96 includes an address decoder 96A coupled to the address bus 36 and a sense amplifier and read/write buffer 96B coupled to the data bus 52. The most significant bit 98 and a next significant bit 100 of the address bus 36 are coupled to the address decoder 96A through AND gates 102 and 104, respectively, which are respectively coupled to receive signals corresponding to the output of the latch circuit 90 which determines the data memory space. The other bits 110 of the address bus 36 are directly coupled to the address decoder 96A.

When both of the signals 106 and 108 are at the high level, is allowed to anywhere in the overall RAM 96. When the signals 106 and 108 are at the low level and at the high level, respectively, access is allowed to only a half of the overall RAM 96, since the output of the AND gate 102 is fixed to the low level so that an access to addresses having the most significant bit of "1" is inhibited. In addition, when both of the signals 106 and 108 are at the low level, is allowed to access only one-fourth of the overall RAM 96, since the outputs of the AND gates 102 and 104 are fixed to the low level so that an access to an addresses having the most or next significant bit of "1" is inhibited.

In the above mentioned embodiment, the information for determining the memory space is transferred from the EPROM through the data bus, and required information is selectively latched. Accordingly, even in the case in which each memory has a large memory area, and a program memory is far separate from a data memory, the information for determining the memory space is latched at a desired position so as to be used for control of the memory space.

The invention has thus been shown and described with reference to the specific embodiments. However, it should be noted that the present invention is in no way limited to the details of the illustrated structures but changes and modifications may be made within the scope of the appended claims.

I claim:

1. A single-chip microcomputer comprising:
    an erasable programmable read only memory cell matrix including a specific cell storing an item of information for discrimination of a memory space;
    decoder means coupled to an address bus and the memory cell matrix for putting in a readable condition a memory cell designated by an address on the address bus;
    read means coupled to the memory cell matrix for reading and outputting a content stored in the memory cell put in the readable condition;
    buffer means coupled to the read means and a data bus to output data outputted from the read means to the data bus;
    latch means coupled to the read means for latching data outputted from the read means;
    logic means coupled to receive the content of the latch means and at least one selected bit of the address bus for outputting a control signal to the buffer means; and
    a control unit having a gate coupled between the decoder means and the memory cell matrix and receiving a reset signal, the control unit operating such that when the reset signal is indicative of a reset operation, the control unit controls the gate to cause it to bring only the specific cell into the readable condition, and to cause the latch means to latch the information stored in the specific cell and outputted through the read means, and when the reset signal becomes not indicative of a reset operation, the control unit controls the gate to cause it to pass outputs of the decoder means to the memory cell matrix as they are, and to control the latch means to maintain the latched information as it is, such that when the content of the latch means is at a first logic level, the logic means outputs the control signal to the buffer means to inhibit the output of the read means to the data bus regardless of the one selected bit of the address bus, and when the content of the latch means is at a second logic level opposite to the first logic level, the logic means outputs the control signal to the buffer means to inhibit the output of the read means to the data bus in accordance with the one selected bit of the address bus.

2. A single-chip microcomputer as claimed in claim 1 wherein the gate includes an OR gate having an output connected to the specific cell, a first input connected to a corresponding output of the decoder means and a second input connected to receive the reset signal, and a plurality of AND gates each having a first input connected to a corresponding one of outputs of the decoder means excluding the output connected to the first input of the OR gate, a second input connected to receive the reset signal through an inverter, and an output connected to a corresponding cell of the memory cell matrix.

3. A single-chip microcomputer as claimed in claim 1 wherein the logic means includes an AND gate having a first input connected to the output of the latch means and a second input connected to receive the selected bit of the address bus, and an inverter having an input connected to an output of the AND gate and an output connected to the buffer means.

4. A single-chip microcomputer as claimed in claim 1 wherein the logic means includes an AND gate having a first input connected to the output of the latch means and a second input connected to receive a third most significant bit of the address bus, an OR gate connected to receive the most and second significant bits of the address bus and an output of the AND gate, and an inverter having an input connected to an output of the OR gate and an output connected to the buffer means.

5. A single-chip microcomputer comprising:
    an erasable programmable read only memory cell matrix coupled to an address bus and a data bus and including a specific cell storing address boundary discrimination information;
    means responding to a reset signal for initializing said single-chip microcomputer, to select said specific cell of said erasable programmable read only memory and read said address boundary discrimination information from said specific cell of said erasable programmable read only memory when said single-chip microcomputer is in a reset condition;

latch means for latching said address boundary discrimination information read from said specific cell of said erasable programmable read only memory in response to said reset signal when said single-chip microcomputer is in said reset condition; and an inhibit unit coupled to said latch means to define an internal memory space when said single-chip microcomputer is in an operating condition, and receiving a memory address to be accessed to operate such that when said memory address to be accessed is within said defined internal memory space, said inhibit unit accesses said erasable programmable read only memory on the basis of said memory address to read information from said erasable programmable read only memory, and when said memory address to be accessed is outside of said defined internal memory space, said inhibit unit inhibits reading of information from said erasable programmable read only memory.

6. A single-chip microcomputer as claimed in claim 5 wherein the inhibit means is composed of a space discriminator coupled to the latch means and associated to the memory cell matrix for defining a memory space to be accessed within the memory cell matrix.

7. A single-chip microcomputer as claimed in claim 5 wherein the inhibit means includes a logic circuit coupled between the address bus and a data memory so as to selectively mask at least one bit of an address supplied from the address bus to the data memory, on the basis of the item of information for discrimination of the memory space latched in the latch means, so that a memory space to be accessed is defined within the data memory.

8. A single-chip microcomputer having an erasable programmable read only memory and a data memory, said single-chip microcomputer comprising:

first storing means for storing first address boundary discrimination information for said erasable programmable read only memory;

second storing means for storing second address boundary discrimination information for said data memory;

means responding to a reset signal for initializing said single-chip microcomputer, to select said first and second address boundary discrimination information from said second storing means when said single-chip microcomputer is in a reset condition;

first latch means responding to said reset signal to latch said first address boundary discrimination information read out of said first storing means, when said single-chip microcomputer is in said reset condition;

second latch means responding to said reset signal to latch said second address boundary discrimination information read out of said second storing means, when said single-chip microcomputer is in said reset condition;

a first inhibit unit operating on the basis of the content of said first latch means to define an internal program memory space, said first inhibit unit receiving a program memory address to be accessed and operating such that when said program memory to be accessed is within said defined internal program memory space, said first inhibit unit accesses said erasable programmable read only memory on the basis of said program memory address to read a program from said erasable programmable read only memory, and when said program memory address to be accessed is outside of said defined internal program memory space, said first inhibit unit inhibits reading of a program from said erasable programmable read only memory; and a second inhibit unit operating on the basis of the content of said second latch means to define an internal data memory space, said second inhibit unit receiving a data memory address to be accessed and operating such that when said data memory address to be accessed is within said defined data internal memory space, said second inhibit unit accesses said data memory on the basis of said data memory address to read from or write data to said data memory, and when said data memory address to be accessed is outside of said defined data internal memory space, said second inhibit unit inhibits reading and writing of data from and to said data memory.

* * * * *